United States Patent [19]
Collins

[11] 3,853,048
[45] Dec. 10, 1974

[54] SHELLER DEVICE FOR PEAS AND THE LIKE

[76] Inventor: Glendale Collins, P.O. Box 642, Calhoun City, Miss. 38916

[22] Filed: Mar. 12, 1973

[21] Appl. No.: 340,372

[52] U.S. Cl. ............................... 99/572, 130/30 G
[51] Int. Cl. ........................ A47j 17/00, A47j 43/00
[58] Field of Search ............................. 99/572–583; 130/30 G; 310/50; 74/15.2–15.6

[56] References Cited
UNITED STATES PATENTS

| | | | |
|---|---|---|---|
| 1,798,543 | 3/1931 | Kodama | 130/30 G |
| 2,645,944 | 7/1953 | Crichton, Jr. et al. | 74/15.6 |
| 2,664,002 | 12/1953 | Anderson | 64/6 |
| 2,804,873 | 9/1957 | Williams, Jr. et al. | 130/30 G |
| 3,695,273 | 10/1972 | Taylor | 130/30 G |

*Primary Examiner*—Leonard D. Christian
*Attorney, Agent, or Firm*—Clarence A. O'Brien; Harvey B. Jacobson

[57] ABSTRACT

A compact, portable pea sheller device adapted to be driven by a portable food mixer, said device comprising a housing with a removable lid or cover which may be used as a container for collecting the shelled peas, a pair of spaced rollers rotatably mounted in the housing and drivingly connected to an input shaft, and a coupling removably fastened to one end of the input shaft for convenient connection to a portable mixer, or the like.

4 Claims, 4 Drawing Figures

PATENTED DEC 10 1974 3,853,048
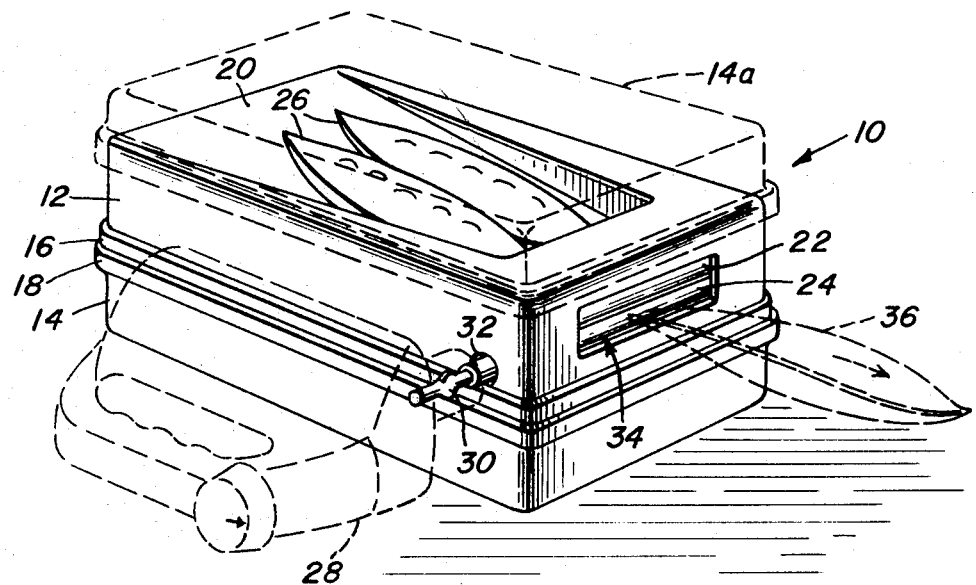
Fig. 1
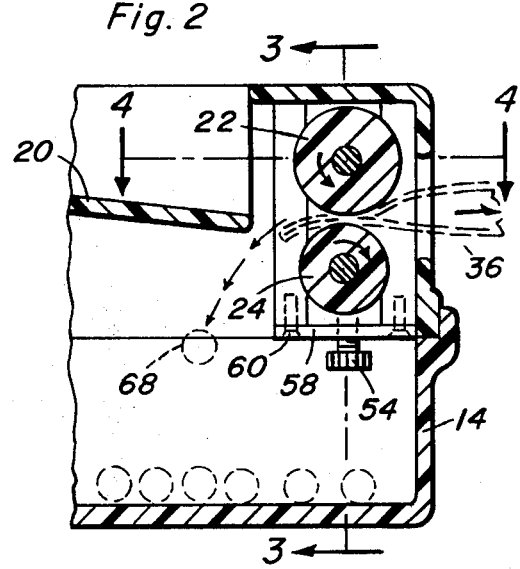
Fig. 4
Fig. 2
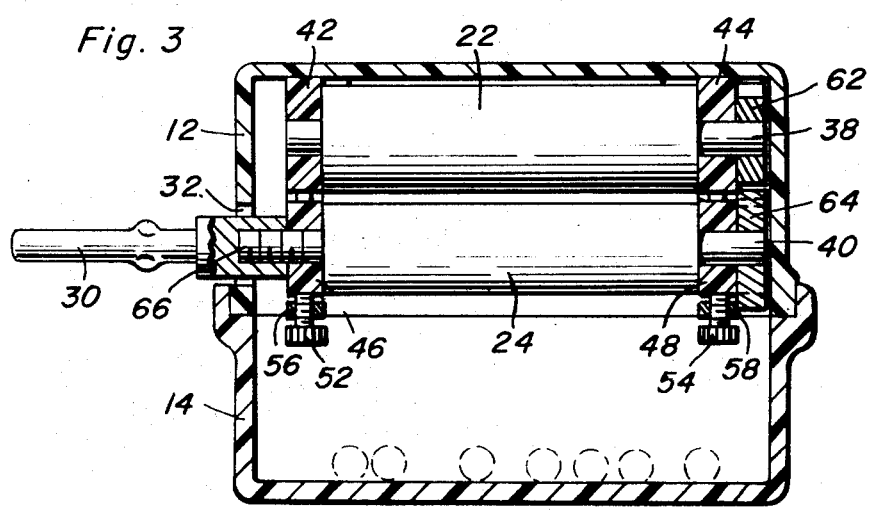
Fig. 3

SHELLER DEVICE FOR PEAS AND THE LIKE

The present invention is generally related to food processing machines and, more particularly, to an improved device for shelling peas, butter beans, and the like.

In the past, various machines have been proposed or manufactured which were capable of shelling peas and similar vegetables to remove the hulls therefrom. For the most part, such conventional machines were of relatively complex construction, of considerable size and weight, and expensive to manufacture. As such, most conventional machines were too costly for the average homemakers to afford. Furthermore, even those homemakers who could afford such devices found that they were too large and awkward for convenient use in the kitchen.

It is an object of the present invention to provide an improved device for shelling peas and other vegetables which overcomes the above-mentioned problems of conventional shelling machines.

Another object of the present invention is to provide a novel sheller device which is of compact, lightweight construction which is readily adaptable for use in kitchens and which may be conveniently stored in a minimum amount of space.

It is a further object of the present invention to provide a unique sheller device including a housing with a dual purpose lid or cover which also serves as a container for receiving the peas or other vegetables after they are shelled.

Still another object of the present invention is to provide a versatile food mixer attachment for shelling peas and the like including a coupling which is readily connectible to most conventional portable food mixers to provide a convenient and inexpensive source for driving the attachment.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a perspective view of the sheller attachment of the present invention with a typical portable food mixer shown in phantom.

FIG. 2 is a partial sectional view of the rollers associated with the present invention illustrating the movement of a typical pea hull as it is passed between the rollers to remove the peas therefrom.

FIG. 3 is a sectional view taken along section 3—3 of FIG. 2.

FIG. 4 is a sectional view taken along section 4—4 of FIG. 2.

Referring now, more particularly, to FIG. 1 of the drawings, the sheller device of the present invention is generally indicated by the numeral 10 and includes a housing 12, preferably formed from plastic, or other lightweight materials and provided with a lid or cover member 14 formed from similar material. The bottom peripheral edges of housing 12 are provided with a flange 16 which is adapted to cooperate with a similar flanged portion 18 associated with cover member 14. Member 14 serves a dual purpose, in that it may be used either as a container for receiving peas or other vegetables after they have been shelled, or as a cover when moved to the position shown in dash line at 14a.

Housing 12 is provided with an inclined vegetable-receiving surface 20 on its upper side defined by a rigid panel or wall extending across a substantial portion of the housing. Surface 20 slopes downwardly toward a pair of spaced, parallel rollers 22 and 24 which are rotatably mounted within the confines of the housing, as hereinafter explained. Unhulled peas, butter beans, or other vegetables are manually placed on inclined surface 20 as indicated at 26 such that they are fed longitudinally into the space separating rollers 22 and 24. The nature of the rollers and the spacing therebetween is such that the tips of the pea hulls are grasped and pulled through the rollers to force the peas therefrom into container 14, as hereinafter explained. The rollers are driven by a portable food mixer indicated in dash line at 28 drivingly connected to a coupling 30 which protrudes through an aperture 32 formed in a side wall of housing 12. An exit opening 34 is provided at one end of the housing in general alignment with the space between rollers 22 and 24, whereby the pea hulls may be exited from the housing as they pass from between the rollers, as indicated at dash line at 36.

Referring now, more particularly, to FIGS. 2–4, operation of the sheller device of the present invention may be understood in more detail. Rollers 22 and 24 are formed from hard rubber, or similar material, and are mounted to rigid shafts 38 and 40, respectively, which are rotatably supported within the housing by way of bushings 42, 44, 46, and 48. Bushings 42 and 44 associated with roller 22 are stationary relative to the housing and may be fastened thereto by appropriate means, such as cement, screws, or other means, not illustrated. On the other hand, bushings 46 and 48 are adjustable relative to housing 12. Preferably, this is achieved by providing housing 12 with a pair of vertical mounting slots which cooperate with tabs 50 formed on each bushing to permit vertical adjustment of the bushings.

Referring more particularly to FIG. 3, it will be observed that bushings 46 and 48 rest upon adjustment screws 52 and 54, respectively, which are threadedly received by bracket members 56 and 58. Brackets 56 and 58 are secured to housing 12 by way of screws 60, or similar fastening means. It will be appreciated that rotation of screws 52 and 54 causes a corresponding vertical adjustment of the position of bushings 46 and 48. This results in a corresponding adjustment of the gap or space separating rollers 22 and 24. It will be appreciated that since member 14, which serves as a container, may be readily removed, screws 52 and 54 are easily accessible for adjusting the spacing between the rollers should such be necessary to accommodate different types or sizes of vegetables. A pair of gears 62 and 64 are affixed to shafts 38 and 40, respectively, for rotation therewith. If desired, a key or spline-type fitting may be provided for each gear to assure that it rotates with the associated shaft. Gears 62 and 64 are in meshing engagement with each other and the teeth associated with each gear are such that the gears may be radially adjusted relative to each other within a range satisfactory for adjusting the space between rollers 22 and 24. Preferably, this space may be adjusted from 1/64 to 1/8 inch. Such has been found to be suitable for handling most peas and butter beans.

Referring particularly to FIG. 3, it will be observed that one end of shaft 40 is threaded, as indicated at 66 with coupling 30 threaded thereto. The shaft end at 66 does not extend beyond the confines of housing 12 when coupling 30 is removed. This provides an extremely compact housing structure which requires a minimum amount of storage space when coupling 30 is removed.

Referring again to FIG. 2, it will be appreciated that inclined surface 20 terminates in close proximity to the space between rollers 22 and 24, wherby the tips of the pea or butter bean hulls automatically come into alignment with the space and are frictionally grasped by the rollers, whereby the hulls are pulled through the rollers and the peas or beans 68 are forced from the hulls and drop into container 14. As the hulls are ejected from the rollers, they pass through exit opening 34, as explained above.

From the foregoing description, it will be appreciated that the sheller device of the present invention provides a versatile means of conveniently shelling peas, butter beans, or similar vegetables with a minimum amount of effort. The preferred embodiment of the invention is of extremely compact construction, being approximately 8 × 5 × 2½ inches. It will also be appreciated that since the device is readily adaptable to be driven by a conventional portable food mixer, the selling price of the device may be kept to a minimum, and within the financial means of most homeowners. For storage purposes, the coupling 30 may be easily removed and member 14 positioned on top of housing 12 to serve as a lid or cover to keep dust and other contaminants from accumulating on the vegetable receiving surfaces 20.

The foregoing is considered as illustrative only of the principles of the invention. Further, since numerous modifications and changes will readily occur to those skilled in the art, it is not desisred to limit the invention to the exact construction and operation shown and described, and accordingly all suitable modifications and equivalents may be resorted to, falling within the scope of the invention.

What is claimed as new is as follows:

1. A device for driving by a portable food mixer, said device including a housing consisting of upper and lower sections, said upper section including a top wall and depending peripheral side walls and said lower section including a bottom wall and upstanding peripheral side walls, said upper housing section being removably supported from said lower housing section with corresponding lower and upper marginal edges of the side walls of said upper and lower housing sections, respectively, telescopingly engaged with each other, a pair of vertically spaced horizontal rollers journaled from said upper housing section immediately inwardly of one peripheral side wall thereof, means drivingly connecting said rollers together for simultaneous rotation in opposite directions, said top wall including a central integral elongated and downwardly inclined portion extending from one end adjacent the peripheral side wall of said upper housing section remote from said one peripheral side wall toward the latter and terminating at the other end thereof at a point spaced slightly inwardly of and generally horizontally aligned with the adjacent peripheral portions of said rollers, at least the central portion of the end edge of said other end of said inclined portion being free of attachment to other portions of said housing, said one peripheral side wall of said upper housing section including an opening formed therein in horizontal registry with the adjacent peripheral portions of said rollers, and one of said rollers including an endwise outwardly projecting extension received through the adjacent peripheral side wall of said upper housing section and including means adapting said extension to have a portable kitchen hand mixer drive shaft removably drivingly coupled thereto.

2. The combination of claim 1 wherein said extension is removably drivingly supported from said one roller whereby said extension may be removed during periods of non-use and stored within said housing.

3. The structure set forth in claim 1 wherein said rollers are slightly spaced apart.

4. The structure set forth in claim 3 together with means for adjusting said space between the rollers to accomodate different types and sizes of vegetables.

* * * * *